No. 614,467. Patented Nov. 22, 1898.
P. HANSON.
GRAIN BINDER.
(Application filed Dec. 16, 1897.)
(No Model.) 5 Sheets—Sheet 5.
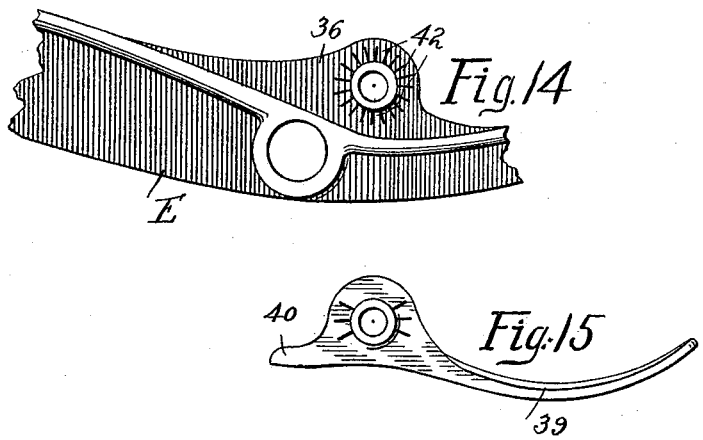
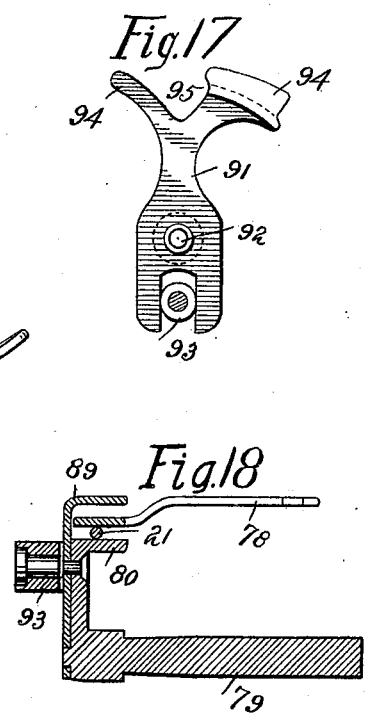
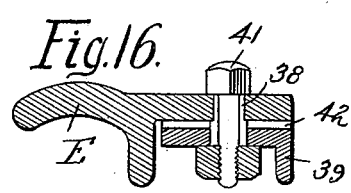
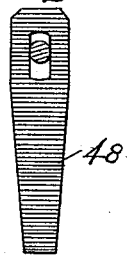
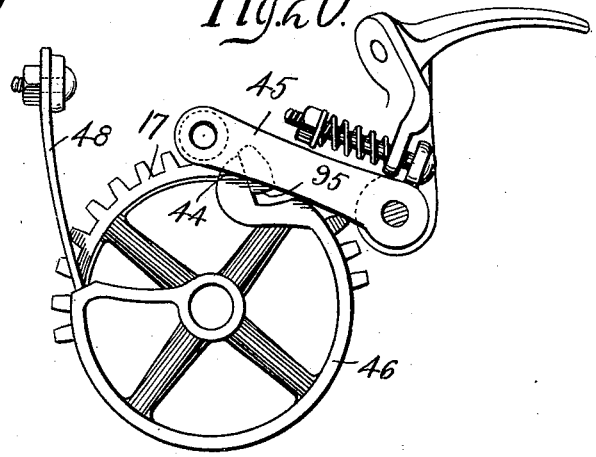
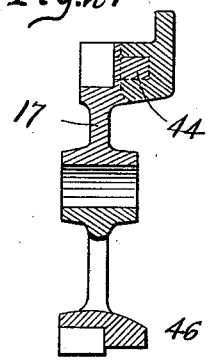
Witnesses.
Wm. M. Rheem
E. C. Sempler
Inventor
Paul Hanson
by Brown & Darby
att'ys

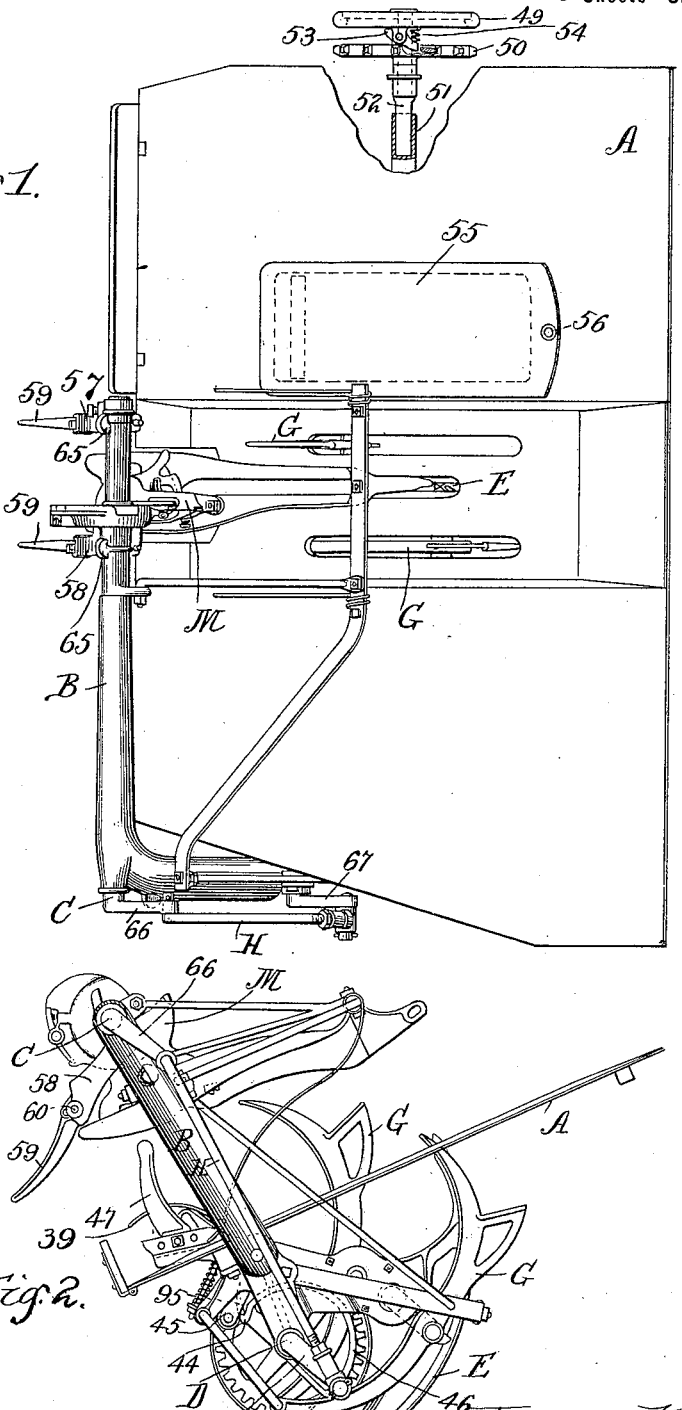

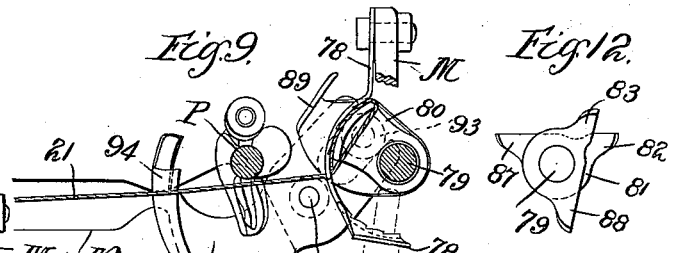

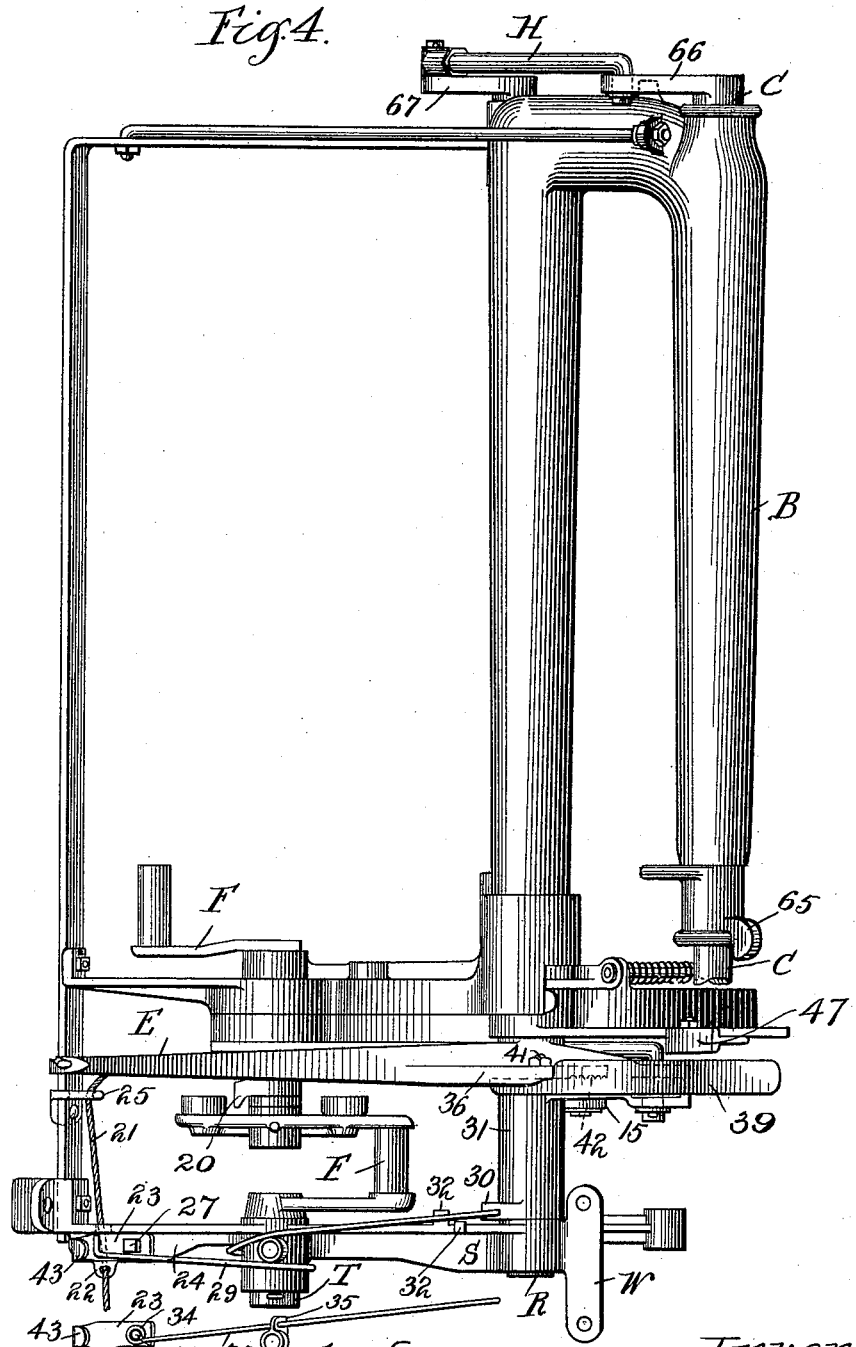

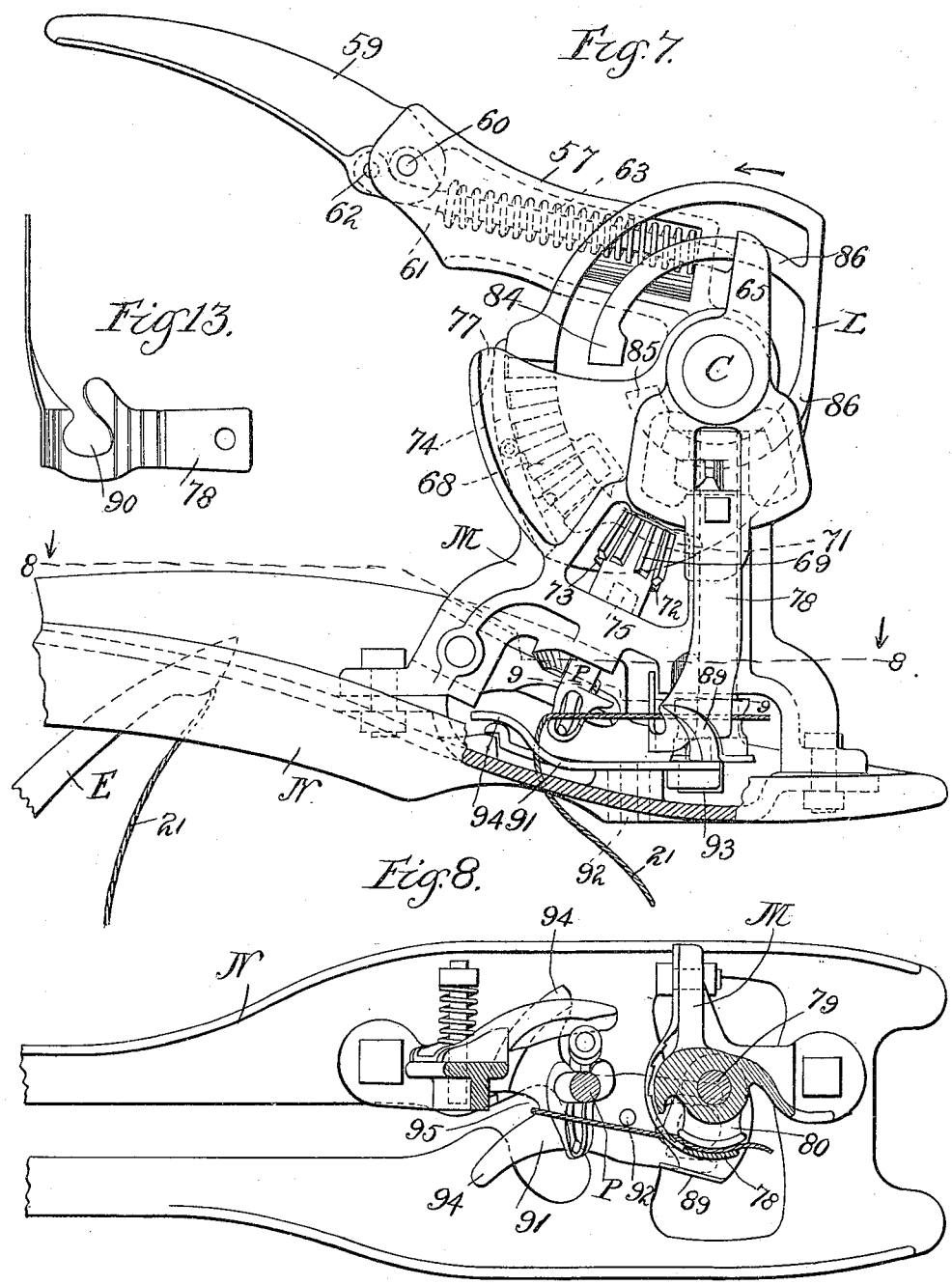

UNITED STATES PATENT OFFICE.

PAUL HANSON, OF CHICAGO, ILLINOIS, ASSIGNOR TO THE DEERING HARVESTER COMPANY, OF SAME PLACE.

GRAIN-BINDER.

SPECIFICATION forming part of Letters Patent No. 614,467, dated November 22, 1898.

Application filed December 16, 1897. Serial No. 662,128. (No model.)

*To all whom it may concern:*

Be it known that I, PAUL HANSON, a citizen of the United States, residing at Chicago, in the county of Cook and State of Illinois, have invented a new and useful Improvement in Grain-Binders, of which the following is a specification.

This invention relates to grain-binders.

The object of the invention is to simplify and improve the construction of grain-binders, and particularly the discharge-arms, the knotter mechanism, and various other minor details, all as will be more fully hereinafter set forth.

The invention consists, substantially, in the construction, combination, location, and relative arrangement of parts, all as will be more fully hereinafter set forth, as shown in the accompanying drawings, and finally specifically pointed out in the appended claims.

Referring to the accompanying drawings and to the various views and reference-signs appearing thereon, Figure 1 is a view in plan of a grain-binder with my invention applied thereto. Fig. 2 is a view in elevation of the front end of the binder. Fig. 3 is a similar view, on an enlarged scale, of the rear end of the binder, the parts being in position ready to commence the operation of forming a bundle. Fig. 4 is a plan view of the operating mechanism with the binder-deck, knotter mechanism, and discharge-arms removed. Fig. 5 is a detached detail view of a slightly-modified tension device. Fig. 6 is a detached detail view, partly in section, of one of the discharge-arms. Fig. 7 is a broken detail view, in rear elevation, of the knotter mechanism, the discharge-arm being shown in its extreme upper limit. Fig. 8 is a horizontal sectional view of the same on the line 8 8, Fig. 7, looking in the direction of the arrows. Fig. 9 is a horizontal sectional detail view, the framework and the breastplate being omitted, along the line 9 9, Fig. 7, and illustrating the operation of the knotter mechanism. Fig. 10 is a similar view showing the parts in the positions occupied at the moment the knot has been formed and it is ready to be stripped. Fig. 11 is a detached detail view showing the construction and relative arrangement of the knotter-pinion and its operating-pawl. Fig. 12 is a detached detail view in plan of the cord-holder pinion. Fig. 13 is a detached detail view, in side elevation, of the cord-holder clamp. Fig. 14 is a detached detail view, in side elevation, of a portion of the needle, showing the construction for adjustably securing the needle extension thereto. Fig. 15 is a detached detail view of the needle extension. Fig. 16 is a sectional detail view through the bolt which adjustably holds the needle to the needle extension. Fig. 17 is a detached detail view in plan of the stripper, showing the slot in the heel thereof. Fig. 18 is a sectional detail view through the axis of shaft 79, showing the relative arrangement of cord clamp and holder. Fig. 19 is a detached detail view in plan of the spring 48, showing the adjustability thereof. Fig. 20 is a detail view, in side elevation, of the operating-wheel, showing the relative arrangement of cam-surface and coöperating parts. Fig. 21 is a transverse sectional view of the operating-wheel.

The same part is designated by the same reference-sign wherever it occurs throughout the several views.

In the drawings reference-sign A designates the binder-deck; B, the binder-frame; C, the knotter-operating shaft; D, the main operating-shaft; E, the needle; F, the packer-cranks; G, the packers, and H the pitman, by which motion is transmitted from the main driving-shaft D to the knotter-operating shaft C.

The parts so far described may be of any well-known construction and arrangement—such, for instance, as is set forth more fully in my application, Serial No. 551,142, filed May 31, 1895, except that in said application the knotter-operating shaft is given a complete revolution for each bundle, whereas in the present case, and as will be more fully hereinafter referred to, said shaft C is given only a rocking motion, substantially as shown in my Patent No. 510,174, issued December 5, 1893.

In my prior application I have shown and described the needle as being mounted on a stud suitably mounted in the framework and driven by means of a link eccentrically connected to a drive-wheel mounted upon the main drive-shaft, said link being connected to an extension of the needle beyond its point of pivotal support. In said prior application the needle is shown and described as having formed thereon a lug or projection arranged in the path of movement of the driving-link thereof and adapted to be engaged by said link during its movements, whereby the needle is forced to its fully-retracted position positively. Such arrangement is necessary in order to prevent the pressure of the incoming grain against the back of the needle during the time it has been advanced to its work, which pressure tends to prevent the needle from being fully retracted. In my prior arrangement, however, for overcoming this difficulty and insuring that the needle is fully and positively retracted to its fullest extent I have found that there is danger of wear at the point where the lug engages the flange on the driving-link, and besides if an undue obstruction is encountered there is danger of breaking the link or the lug. In order to remedy this defect, I provide in the present construction the following arrangement, particular reference being had to Fig. 3, wherein reference-sign 14 designates a lug of considerable extent formed on, carried by, or otherwise secured to the needle, and I mount a roller 15 on the stud 16 in operating-wheel 17, to which the end of link 18 is secured, the relative arrangement of such roller 15 and lug 14 being such that when wheel 17 is rotated in a direction to retract the needle said roller will engage lug 14 as the needle nears its retracted position, thereby forcing the needle fully home to its retracted position. In order to enable the needle to be tripped for the next cycle of operation, the relative arrangement of lug 14 and roller 15 is such that said roller passes slightly beyond the point of said lug after it has completed its work of forcing the needle positively to its fully-retracted position. The surface of lug 14 with which roller 15 engages is preferably slightly convexed in order to secure the proper action of the parts.

From the foregoing description it will be observed that I provide a construction wherein the needle is forced to its fully-retracted position positively and with the least possible wear on the engaging surfaces. It will of course be understood that when the needle attains its fully-retracted position a lug 19 thereon engages the drive-dog 20, as fully shown and described in my before-mentioned application, and therefore specific description of the construction and arrangement of such parts herein is unnecessary.

In the practical operation of a bundle-tying mechanism for grain-binders it is important to impose upon the twine a certain degree of tension during the action of the packers in forming and preliminarily packing the bundle, and it is desirable that this tension should be comparatively slight in order to prevent the packers, particularly at the beginning of the operation, from tilting the straws laterally about the binding-cord as a fulcrum, such rocking being objectionable not only because it threshes out the grain, but in the case of short grain it disturbs the symmetry of the bundle, whereas if only a slight tension is imposed upon the binding-cord such cord would yield gently to the pressure of the packers and still be held with sufficient tautness around the forming gavel to prevent bulging or packing of the bundle during its formation. However, after the bundle has been formed and the needle is advanced to its work of compressing the gavel and coöperating in the tying of the knot, it is important to increase the tension on the cord in order that such cord may be drawn tight around the bundle before the knot is tied, and therefore I provide means whereby only a slight tension may be imparted to the binder-cord during the operation of the packers, but an increased tension is imparted to such cord when the needle is advanced. This idea may be embodied in many specifically different forms. For instance, and as shown in Figs. 3 and 4, I arrange the cord 21 to be threaded through an opening formed in a depending lug 22 on a tension-plate 23. Thence the cord passes under said plate and between the same and a rib or flange 24, formed on the framework, and thence on in any suitable or convenient manner through a guide 25 and through the eyes on the needle in the usual manner. A spring 26, mounted on a bolt 27, which is secured to plate 23, serves to impart a desirable degree of tension to said plate, tending to clamp the same down upon the cord lying underneath it, the tension of said spring being suitably adjusted, as by means of a wing-nut 28. This tension is increased and augmented, however, to a certain degree by means of a spring 29, having one end thereof arranged to bear on the upper surface of plate 23 and intermediate its ends suitably coiled about a convenient part of the framework—such, for instance, as the journal-bearing of the packer-shaft—and having its other end arranged to bear upon the framework and in position for the free end thereof to be engaged on the under side by a lug or cam 30 on the hub 31 of the needle. If desired, said spring may be held and guided between lugs 32, formed on the framework. In the normal position of the parts when the needle is in its retracted position only a slight tension is imparted to plate 23 in addition to the tension of spring 26, but when the needle is advanced to its work this additional tension imparted by spring 29 is increased by the lug or cam 30, formed on the hub 31 of the needle, engaging the free end of spring 29 and raising the same, thereby increasing the tension on the cord as the needle continues to advance, and hence causing the cord to be drawn tightly around the bundle while it is compressed to its greatest extent and during the operation of tying the knot.

In Fig. 5 I have shown a slightly-modified arrangement of spring, wherein, instead of a coiled spring, as shown in Figs. 3 and 4, I may employ a straight spring-rod 33, having an eye 34, arranged to be received upon the bolt 37, and thence passing through a suitable lug 35, formed on a convenient part of the framework and having its free end arranged in position to be engaged by lug or cam 30 on the hub 31 of the needle.

From the foregoing description it will be seen that I provide an exceedingly simple and inexpensive construction for increasing the tension on the cord as the needle is advanced to perform its work of compressing the gavel. It may sometimes be desirable to raise the tension-plate 23 in order to facilitate the threading of the cord therethrough. In order to accomplish this object in a simple and convenient manner, I provide the tension-plate with a hook or integral portion 43, which may be grasped thereby, enabling said plate 23 to be slightly raised from its seat. Of course it will be understood that the cord may be threaded through the tension device without raising said plate; but by raising said plate the opening through the depending flange 22 may be brought more directly into line and register with the opening through the framework, as will be clearly seen by reference to Figs. 3 and 4.

In my above-mentioned application I have shown the needle provided with an adjustable extension beyond its point of pivotal support, whereby the point at which the needle is rocked to disengage the lug 19 thereon from the drive-dog 20 to set in operation the mechanism by which the needle is advanced to its work may be varied, thereby regulating to a certain extent the size of the bundles. The adjustment in such prior construction was secured by raising the pivotal extension upon the end of an adjustable bolt. I have found, however, that in such construction the danger is incurred of such pivotal extension freely swinging about its point of pivotal support upon the needle. In order to avoid this danger and at the same time provide a construction wherein a desirable range of adjustment of such extension may be secured, I provide the following construction: The needle E is provided with a flange 36, having a projecting rib 37. Said flange 36 is provided with an elongated slot, (indicated in dotted lines at 38,) and I provide the extension 39 with the end 40 thereof arranged to engage underneath the rib or projection 37 of flange 36. A bolt 41 serves to adjustably clamp the extension 39 in the slot 38 of the needle-flange. If desired, the needle-flange may be provided with grooves or seats, as indicated in dotted lines at 42, Fig. 4, adapted to receive a tooth or projection formed on the extension 39. By this construction it will be seen that I secure the advantages of an adjustable extension, while at the same time the end 40 of such extension is confined between the hub of the needle and the rib or projection 37, formed on the flange 36 thereof, in whatever position the extension 39 may be adjusted to. Moreover, by providing the needle with the flange 37 I provide a construction wherein a degree of compression is exerted upon the bundle from underneath the same, which is a desirable feature, as it tends to compress the bundle into cylindrical shape and more nearly equalizes the pressure all the way around the same.

In my before-mentioned application I have shown and described a construction wherein the compressor-bar is arranged to be held in position for the gavel to be compressed thereagainst by means of a cam formed on the face of the operating-wheel and operating against the free end of the lever forming part of the compressor-bar, said cam being so shaped as to release the compressor-lever and permit the compressor-hook to swing down below the binder-deck during the operation of the discharge-arms. The cam for engaging and operating the compressor-lever in said prior application was arranged to surround the antifriction-roller in the free end of the compressor-lever to such an extent as to cause the free end of the compressor-hook to rise above the binder-deck too soon, thereby opposing the action of the discharge-arms and frequently engaging in the straws of the bundle while it is being discharged. This objection was increased by reason of the fact that the cam-surface for rocking the compressor-lever was of greater extent than a semicircle. In order to overcome this objection in the present construction, I arrange only a slight projection or seat at the beginning of the cam-surface, as indicated at 44, Fig. 2, and which will not surround the roller in the end of compressor-lever 45, but adapted to receive a cam projection 95, formed on the compressor-lever, and I arrange the cam-surface 46, by which said compressor-lever is actuated, to extend only to about substantially a semicircle. By this construction I avoid the danger and objection of the free end of the compressor-hook 47 rising above the binder-deck A in advance of the proper time for said compressor-hook to be raised, thereby enabling the discharge-arms to complete their work of discharging the bundle before said hook is raised.

I have found in my prior construction that the driving-rollers which engage and drive the pinion through which the main operating-gear is actuated when riding over the tail of dog 20 when said dog is held by stop 19 on the needle cause an undue wear on the engaging surfaces and a pounding of the parts. This, as is well known, is due to the action of the spring which is arranged to act upon said dog 20, normally tending to throw the tail of said dog into the path of the driving-rollers as soon as the dog is released. In order to overcome this objection, I provide the seat or projection 44 in cam 46 with substantially a straight surface to engage the end of compressor-lever 45, thereby rigidly locking the main drive-gear against the tendency to move in a reverse direction, and in order to accommodate for any variations that may occur in the construction and building of machines of this character I provide an adjustable spring 48 and arrange the same to bear against the cam and operating in a direction to take up or overcome any backlash therein.

It is well known to be desirable to operate the parts of the binder attachment without operating the other parts of the harvesting-machine. In a type of machine wherein the discharge-arms are rocked instead of being rotated this operation is difficult of attainment when the ordinary methods for accomplishing the result are pursued. In order to secure the desired result in my type of machine, I provide a hand-wheel 49, mounted to rotate with the packer-shaft and provided with means arranged to engage the drive-gear 50, which is mounted to rotate loosely with respect to the packer-shaft, whereby when said gear-wheel is rotated the hand-wheel is locked to rotate therewith, but said hand-wheel may be rotated independently, in one direction, of said drive-gear 50. This result may be accomplished in many specifically different constructions. In the particular form shown I provide a sleeve 51, suitably secured to rotate with the packer-shaft, and in which sleeve is mounted to rotate therewith a shaft 52, upon which is rigidly mounted the hand-wheel 49, and mounted on said shaft to rotate freely is the drive-gear 50. The hand-wheel 49 is provided with a drive-dog 53. A spring 54 operates to normally hold said dog in position to be engaged by a convenient part of the drive-gear—such, for instance, as a spoke, as illustrated in Fig. 1—but which spring permits the drive-dog to ride over the engaging part of the drive-gear in case the hand-wheel, and with it its supporting-shaft, is rotated independently of the drive-gear. Of course it is obvious that instead of employing a hand-wheel, a crank-arm would answer the purpose.

In order to enable access to be had handily to the mechanism underneath the binder-deck for examination, adjustment, and the like without the necessity of removing the binder-deck, I provide an opening through the binder-deck and I cover the same with a trap-door 55, suitably hinged or pivoted, as at 56. (See Fig. 1.) By suitably swinging the trap-door about its pivot the opening underneath will be revealed, thereby enabling the mechanism underneath the binder-deck to be readily examined or adjusted.

I will now describe the construction and arrangement of the discharge-arms.

In the types of grain-binders heretofore constructed it has been usual to mount the discharge-arms upon a revolving shaft, whereby said arms are given an entire swing around the axis of said shaft to effect a discharge of the bundles. It is desirable to provide a construction wherein the least possible effort is exerted during the discharge operation and also wherein the bundle is efficiently engaged by the discharge-arms. These desirable ends are not secured in the prior construction, wherein the discharge-arms revolve. In my prior patent above referred to I have endeavored to overcome these objections by providing a construction wherein the discharge-arms are rocked as distinguished from a complete revolution thereof. In said prior patent I have disclosed a construction wherein the discharge-arm comprises springs mounted to rock. The arrangement, however, in said prior patent is such that these spring-arms are advanced against the bundle before the compressor-hook begins to recede, and therefore before the bundle is ready to be discharged, thereby storing up a tension by the continued advancement of the spring-arms. Such prior construction also necessitated the use of an auxiliary rigid arm, which was raised from a point beneath the binder-deck in order to positively start the bundle toward the discharge, whereupon the accumulated tension of the spring-arms was exerted to complete the discharge operation. This construction is complicated, requires greater power to operate, and has several other minor defects. In the present construction, however, I mount upon the end of the knotter-operating shaft C a sleeved part 57, and I also form integrally with the knotter-operating gear a similar and coöperating part 58. Pivotally mounted in the outer end of each of said parts 57 58 are the discharge-arms proper, 59, (see particularly Figs. 1, 2, 3, 6, and 7,) the point of pivotal attachment of the portion 59 of the discharge-arms being indicated at 60, Figs. 2, 6, and 7. Pivotally connected to each of the portions 59 of the discharge-arms is a rod 61, the point of pivotal attachment 62 being intermediate the outer end of the portion 59 and its pivotal point 60. This rod 61 is arranged to pass loosely through the chamber of casting 57 58, and a spring 63 is mounted thereon to bear at one end against a collar 64 on said rod and at the other end against the inner wall of the chamber of said casting. The tension of this spring is exerted in a direction to normally and yieldingly maintain the portion 59 of the discharge-arms nearly in substantial alinement with the casting 57 58 and radially with respect to the axis of the knotter-operating shaft C, the end of the casting forming a stop for said portions 59. The heel of the portion 59 of the discharge-arms is also arranged, when rocked about its pivot to its fullest extent under the influence of spring 63, to engage the rod 61, which thus forms an additional stop for the portion 59. Instead of rotating the knotter-operating shaft C said shaft is rocked through the pitman H in the manner indicated in my patent before mentioned. The edge of the portions 59 of the discharge-arms, which is presented to the bundle when the discharge-arm stands in the position ready to be advanced to discharge the bundle, is preferably and, as shown, slightly curved in the direction of its link, as indicated in Fig. 7, the position occupied by the discharge-arm, as illustrated in this figure, being that which it occupies when it is ready to be rocked to discharge the bundle.

By the construction above described it will be seen that I secure the greatest amount of leverage in effecting a discharge movement of said arms, and the portions 59 of said arms which engage the bundle are rigidly held by the abutment of the inner end thereof against the end of casting 58 and rod 61, as above explained. However, after the discharge movement of said arms has been completed the reverse movement of said arms is easily accomplished and without danger of carrying any portion of the straw forming the next succeeding gavel with it, for the reason that when it encounters the gavel of the next bundle which is in process of formation said portions 59 of the discharge-arms yield against the action of springs 63, and hence is enabled to pass freely over the top of the gavel without interference. If, for any reason, the springs 63 should fail to return the portions 59 of the discharge-arms to their abutment with the ends of castings 58 or rod 61 after being returned to their position ready to be advanced to effect another discharge, I arrange the ends of rods 61 to project loosely through the rear end of castings 57 58 and into position to be engaged by lugs 65, formed on the binder-frame and knotter-frame. This engagement takes place before the discharge-arms attain their limits of movement, and therefore the pivoted portions 59 thereof are positively rocked to their extreme limits of movement by the endwise projection of rods 61, as will be readily understood. Thus I secure the advantages of an increased leverage, for the reason that the crank-arm 66, by which the knotter-operating shaft C is rocked, may be made longer than the crank-arm 67, by which reciprocation is imparted to pitman H from the shaft D of the main operating-wheel. Moreover, I am enabled to so curve the edge of the portions 59 of the discharge-arms which engage the bundle as to conform, substantially, with the contour of the bundles, thereby avoiding the objection of crowding the bundle downwardly against the surface of the binder-deck. Moreover, I avoid the use of strippers heretofore employed, and hence it is possible to drive the machine closer to fences, trees, or the like without danger of undue obstruction. By this construction also the discharge-arms operate as a stop to prevent previously-ejected bundles from rolling back under the discharge-arms and being caught by the compressor-hook when it is raised above the deck in case the bundle-carrier should become overloaded.

I will now describe the construction and operation of the knot-tying apparatus, particular reference being had to Figs. 3, 7, 8, 9, 10, 11, 12, and 13. Suitably mounted upon the knotter-operating shaft C to rock therewith is a casting L, having gear-teeth 68 on the face thereof and forming the knotter-operating wheel, and the knotter-frame is supported upon the shaft, and suitably supported from said shaft is the knotter-frame M in the usual manner, and secured to the knotter-frame is the breastplate N in the usual manner. Suitably journaled in the knotter-frame is the knotter-bill P, carrying a drive-pinion 69, arranged to be engaged and rotated by the gear-rack 68 on the knotter-gear. These parts may be of the usual or any well-known or convenient construction, except that the drive-pinion 69 for the knotter-bill possesses peculiarities, which will now be described. This pinion is provided with a flat delay-surface 70, arranged to coöperate with a corresponding flat surface 71 on the knotter-operating gear to lock said pinion 69, and hence, also, the knotter-bill P, against rotation, except when the gears of said pinion intermesh with the rack 68. In order to provide as great an extent of delay-surface 70 as possible, I form the adjacent teeth 72 73 of greater length than the other teeth of pinion 69, as clearly shown in Figs. 3 and 7. In order that the pinion 69 may be efficiently thrown into commission at the desired moment, I pivotally mount upon knotter-gear L a pawl 74, intermediate the ends thereof and in position for one end thereof to engage a lug 75 on pinion 69. A spring 76 is arranged to normally project the engaging end of pawl 74 into position to contact with lug 75. The operation of this feature is as follows: When gear L is rocked so as to carry pawl 74 into position behind lug 75 to engage the same when moved in the opposite direction, the pawl 74 rides over lug 75, the elevation of the front end of the pawl and the consequent depression of the tail thereof enabling said pawl to be rocked, both the lug and the spring 76 serving to depress the front end of such pawl after the pivot of said pawl 74 has been passed, and on completion of this movement of gear L—that is, after the engaging end of pawl 74 has completely cleared lug 75—spring 76 again operates to throw outwardly the front or engaging end of pawl 74 and into position for said end to engage lug 75 upon the reverse movement of said gear. Should, however, for any reason spring 76 fail to throw outwardly the front or engaging end of pawl 74, I provide a lug 77. (Indicated in dotted lines in Figs. 3 and 7.) This lug is formed on the knotter-frame and in position to positively depress the tail of pawl 74, as clearly indicated in Fig. 7, thereby insuring a throwing out of the front or engaging end of said pawl into position to engage lug 75 on pinion 69 when the gear L is rocked in the opposite direction, thereby throwing into commission the knotter-bill P.

Reference-sign 78 designates the cord-clamp suitably and adjustably mounted upon the knotter-frame. Arranged to rotate in a suitable bearing formed in the knotter-frame is the cord-holder shaft 79, which carries or has formed with it cord-holder 80, which coöperates with cord-holder clamp 78 to clamp the cord. Mounted upon the upper end of shaft 79 is a gear 81 for actuating said shaft. This gear is provided with two engaging teeth 82 83, arranged to be engaged by the abrupt ends 84 and 85, respectively, of the cam-surface 86 of the knotter-gear. Opposite each of the teeth 82 83 are projections 87 88, forming an efficient and sufficient delay-surface, whereby gear 81 is locked against rotation, except when the cam-surface 86 has been passed. By this construction it will be seen that when gear L is rocked in one direction the end 85 of cam 86 engages tooth 83 on gear 81 and rocks the same coincidently therewith, and when gear L is rocked in the opposite direction end 84 engages tooth 82, thereby rocking gear 81 in the opposite direction. These rocking movements of gear 81 and shaft 79 are properly timed to effect the proper holding of the cord, as will presently more fully appear.

Secured to and carried by the cord-holder 80 is the knife 89. This cutter is provided with a blade having a cutting edge presented toward the line of the cord and curved in the direction of the length thereof from the point, as most clearly indicated in Fig. 7. By this construction I secure the advantages of a draw cut. Moreover, by this peculiar shape of the cutter-blade I enable the knife to readily ride under the clamped strand of the cord while said knife is being returned to position to be advanced to effect a severing of the cord. The cord-clamp 78 is provided with an opening 90, into which the cord is laid by the needle when the latter is advanced, and on each side of opening 90 the holder is provided with a clamping portion or surface between which and the coöperating clamping portion of the cord-holder 80 the cord is clamped.

In Fig. 8 the cord-holder 80 is shown coöperating with one clamping-surface of clamp 78, while in Figs. 9 and 10 said holder is shown as coöperating with another portion or surface of the clamp, as will be more fully understood hereinafter.

Reference-sign 91 designates the stripper pivotally mounted, as at 92, upon the breastplate and having a slot in one end thereof arranged to be engaged by a roller 93, mounted on the stud or screw which holds the knife to the cord-holder, as indicated in dotted lines in Figs. 9 and 10. The purpose of employing a roller 93 is to avoid wear. The roller 93 is eccentrically mounted with respect to the axis of rotation of the cord-holder 80. Therefore when shaft 79 is rocked said roller, working in the slot in the heel of stripper 91, effects a rocking of said stripper about its pivot 92. The stripper 91 is provided with extensions 94 on opposite sides of a slot or opening 95, in which opening the cord is received. The function of the extensions 94 is to maintain the cord in proper position to be operated on by the knotter-bill.

The operation of the knotter mechanism is as follows: By referring to Figs. 3 and 9 it will be seen that the end of the cord 21 is held between the cord-clamp 78 and the cord-holder 80. From thence the cord extends around the flange of the cord-holder and through the slot 90 in the cord-clamp, thence over the knotter-bill, thence over the extension 94 of stripper 91, thence through the slot or opening in breastplate N, thence to and through the eye in the point of the needle, and thence to and through the guides and tension-plate, as above described, to the ball in the twine-can in the usual manner. This is the relative position of the parts at the beginning of the operation of forming a bundle. The packers now begin their operation of crowding the grain down upon that portion of the cord lying between the point of the needle and the knotter mechanism. This operation continues until the gavel is formed, whereupon the pressure thereof against the extension 39 of the needle causes the needle to rock about its pivot a distance sufficient for the lug 19 on the needle to clear the drive-dog 20, whereupon rotation is imparted to the main drive-wheel 17, thereby rocking the needle forwardly, thereby completing the loop of the cord around the gavel, as indicated in Fig. 7. At the same time a rocking movement is imparted to the knotter-wheel L in the direction indicated by the arrow in Fig. 3. During the entire extent of motion of knotter-wheel L in this direction the knotter-bill pinion 69 will be locked against rotation by reason of the engagement of the delay-surface 70 thereof with the plane surface 71 on the face of the knotter-operating wheel, and also by reason of the fact that the pawl 74 rides over the lug 75 on the knotter-bill pinion 69, said pawl operating as a delay-surface against the lower ends of the teeth 72 73 of said pinion, which teeth, as above explained, are longer than the other teeth of said pinion in order that this desired result may be attained. This same movement of knotter-wheel L causes the end 85 of the cam-surface 86 of said wheel to engage tooth 83 of gear 81 on shaft 79 of the cord-holder, thereby rocking said shaft, and hence swinging the knife 89 and the cord-holder 80 from the positions thereof indicated in Fig. 9 around and into the relative positions thereof shown in Fig. 8, the curved outline of the rear edge of cutter-blade 89 causing the cord to ride easily thereover. This rocking movement of cord-holder 80, through the engagement of roller 93, carried thereby, with the slot in the tail of stripper 91, causes said stripper to be rocked about its pivot 92 from the position shown in Fig. 9 to the position shown in Fig. 8. This movement enables the cord to be received in the crotch or opening 95 in the stripper, as indicated in Figs. 7 and 8, the cord still lying over the knotter-bill, and the extreme end of the cord, instead of being folded around the flange of the cord-holder, as shown in Fig. 9, is simply held between the inner surface of the cord-clamp 78 and the outer surface of the flange on cord-holder 80, as clearly shown in Fig. 8. With the parts in these positions the advancing movement of the needle is now completed, thereby bringing the other side of the loop of the cord around the bundle up through the opening in breastplate N, and laying the same in the crotch 95 of the stripper over the knotter-bill through the opening 90 in the cord-clamp, and between the flange of cord-holder 80 and the body of the knotter-frame. While in this position, the knotter-wheel L, which has previously attained the position indicated in Fig. 7, begins to rotate in the direction indicated by the arrow in Fig. 7. In the meantime the end of pawl 74 has been thrown out by spring 76 or by lug 77 into position to engage the lug 75 on pinion 69. Therefore the rocking motion of gear L will cause the end of pawl 74 to engage lug 75, and thereby turn the pinion into mesh with the rack-teeth 68 on the face of wheel L, thus causing a rotation to be imparted to knotter-bill shaft P. The rotation of the knotter-bill effects a formation of the knot in the usual manner well understood. Before the knotter-bill shaft completes a revolution the end 84 of cam 86 on the face of wheel L engages tooth 82 on pinion 81 and causes said pinion to begin its rocking movement in the opposite direction to that above described with respect to the same part, and hence in a direction to advance the knife 89 and the flange of the cord-holder, so as to bring the knife into position ready to engage and sever the cord, and also the flange of said holder into position across opening 90 in the cord-clamp to grasp the end of the cord which has been delivered through said slot 90 by the needle and clamp the same between the cord-clamp 78 and said cord-holder flange. This movement of the holder 80 releases the original end of the cord—that is, the end shown in Fig. 8—from between the flange thereof and clamp 78, but before this end is released effecting a clamping of the other portion of the cord which has been delivered thereto by the needle. By this time the knotter-bill has completed one revolution and has formed the knot, and a continuation of the swinging movement of the knife severs the clamped portion of the cord, as clearly indicated in Fig. 10. A completion of the swinging movement of the cord-holder 80 in this direction effects a swinging of the stripper 91, thereby drawing the knot tight and stripping it from the knotter-bill, as shown in Fig. 10, this action of the stripper being facilitated by the action of the discharge-arms, which by the rocking movement of knotter-shaft C have been advanced to a position to eject the bundle, the operation of said arms being so timed that they are advanced against the bundle in a direction to discharge it simultaneously with the rocking movement of the stripper. The retracting movement of the needle to its original position leaves the end of the cord clamped between the cord-clamp 78 and the flange of holder 80 and folded around said flange, thence through the opening 90 across the knotter-bill, over projection 94, through the slot or opening in the breastplate, and back to the needle, as first above explained and as shown in Figs. 3 and 9, ready for the formation of the next bundle. Of course it will be understood that the discharge-arms are being advanced in a direction to discharge the bundles simultaneously with the movement of knotter-wheel L in the direction indicated by the arrow in Fig. 7, and by the time the needle comes to rest in its fully-retracted position, with lug 19 thereon engaging drive-dog 20, the discharge-arms have attained the positions indicated in Figs. 1, 2, and 3, and in these positions these parts are brought to rest by reason of drive-wheel 17 being thrown out of action.

Many variations in the details of construction and arrangement would readily suggest themselves to persons skilled in the art and still fall within the spirit and scope of the invention. I do not desire, therefore, to be limited or restricted to the exact details shown and described; but, Having now set forth the object and nature of the invention and a form of apparatus embodying the same and having explained the construction, function, and mode of operation thereof, what I claim as new and useful and of my own invention, and desire to secure by Letters Patent of the United States, is—

1. In a grain-binder, a needle provided with a lug or projection at the heel thereof, said needle mounted to rock upon a suitably-mounted support, a drive-gear for rocking said needle about its support, means carried by said needle for throwing said gear into and out of action, and means carried by said gear arranged to engage said lug to positively move or force the needle to its extreme retracted position, as and for the purpose set forth.

2. In a grain-binder, a needle, a support upon which said needle is mounted to rock, a lug or projection carried by said needle adjacent to the hub thereof, a drive-gear for rocking said needle, a roller mounted on said drive-gear and arranged to engage said projection to positively force or move the needle to the limit of its retracted position, means for driving said gear, and means carried by said needle for throwing said driving means into and out of action, as and for the purpose set forth.

3. In a grain-binder, a needle, means for actuating the same, in combination with a tension device for the cord comprising a plate, a spring normally acting upon said plate to apply a slight tension to the cord, and a second spring arranged to act upon said plate, said second spring arranged to be acted upon by the needle as it approaches its advanced position, whereby the tension on the cord is increased, as and for the purpose set forth.

4. In a grain-binder, a needle having a lug formed on the hub thereof, means for rocking said needle, a tension device for the cord, and a spring having one end arranged to engage said tension device and the other end arranged to be engaged by the lug on the needle-hub, whereby as the needle is rocked to its advanced position the tension of said device is increased, as and for the purpose set forth.

5. In a grain-binder, a needle, a support upon which said needle is mounted to rock, said needle provided with a ribbed flange at the heel thereof, in combination with a needle extension adjustably mounted on said needle and having its inner end arranged to engage the rib of said flange, as and for the purpose set forth.

6. In a grain-binder, a needle provided with a slotted flange at the heel thereof, said flange provided with a projecting rib, in combination with a needle extension having the end thereof arranged to be confined by said rib, and a bolt arranged to pass through the slot in said flange, and also through said extension, for adjustably securing the latter to said flange, as and for the purpose set forth.

7. The combination with a grain-binder attachment for harvesting-machines, a driving-shaft therefor, a gear for driving said shaft, and means for actuating said shaft by hand independently of said driving-gear, as and for the purpose set forth.

8. The combination with a binder attachment for harvesting-machines, of a driving-shaft therefor, a driving-gear loosely mounted thereon and a hand operating device rigidly mounted on said shaft, and means for interlocking said hand device and gear whereby said gear and hand device are operated in unison, but said hand device may be operated in one direction independently of said gear, as and for the purpose set forth.

9. In a grain-binder, a drive-gear having a cam-flange formed on the face thereof and extending approximately from diametrically opposite points, said flange terminating in an abrupt shoulder forming a seat, in combination with a compressor-lever arranged to be engaged and actuated by said flange and having a projection arranged to be received in said seat, as and for the purpose set forth.

10. In a grain-binder, a drive-gear having a cam-flange formed on the face thereof and terminating in an abrupt seat, in combination with a compressor-lever having a cam projection arranged to normally rest in said seat, and a roller arranged to be engaged by said cam-flange as and for the purpose set forth.

11. In a grain-binder, a drive-gear, a casing therefor, in combination with a spring adjustably secured upon said casing and arranged to bear upon said gear to take up any variation or inequality in the parts, as and for the purpose set forth.

12. In a grain-binder, a drive-gear having a cam thereon, a casing for said gear, in combination with a spring adjustably mounted on said casing and arranged to engage said cam whereby any tendency of said gear to reversely rotate is overcome, as and for the purpose set forth.

13. In a grain-binder, a knotter mechanism, and an oscillatory shaft for actuating the same, in combination with castings mounted to rock with said shaft, arms pivotally connected to said castings, stops for limiting the swinging movement of said arms in one direction relative to said castings, and means for positively forcing said arms into engagement with said stops as the castings approach one limit of their oscillations, as and for the purpose set forth.

14. In a grain-binder, a knotter mechanism, and an oscillatory shaft for actuating the same, in combination with castings mounted to rock with said shaft, arms pivotally connected to said castings, stops for limiting the swinging movement of said arms in one direction relative to said castings, means for yieldingly maintaining said arms in engagement with said stops and means for positively forcing said arms against said stops as the castings approach one limit of their oscillations, as and for the purpose set forth.

15. In a grain-binder, an oscillatory knotter-operating shaft, in combination with castings mounted to rock with said shaft, discharge-arms pivotally connected to said castings, rods pivotally connected to said discharge-arms at points beyond their pivotal connection to said castings, and means for yieldingly maintaining said rods projected endwise toward the point of their pivotal connection to said arms, as and for the purpose set forth.

16. In a grain-binder, an oscillatory knotter-operating shaft, in combination with castings mounted to rock with said shaft, said castings being hollow or chambered, discharge-arms pivotally mounted on said castings, stops with which said arms engage to limit their rocking movement in one direction, and springs arranged in the chambers of said castings and operating to yieldingly maintain said arms in contact with said stops, as and for the purpose set forth.

17. In a grain-binder, a knotter-operating wheel, an oscillatory shaft for actuating the same, a casting sleeved to rock with said shaft, a second casting formed integral with said knotter-operating wheel, a discharge-arm pivotally mounted at the free end of each of said castings, a stop for limiting the rocking movement in one direction of each of said arms relative to said castings, a rod connected to each of said arms, and springs arranged to yieldingly project said rods endwise in a direction to maintain said arms in contact with said stops, as and for the purpose set forth.

18. In a grain-binder, an oscillatory knotter-operating shaft, castings mounted on to rock with said shaft, said castings being chambered, arms pivotally mounted in the free ends of said castings, rods pivotally connected to said arms and arranged to slide freely through the chambers in said castings, and springs interposed between said rods and the walls of said chambers and normally operating to yieldingly project said rods in a direction to maintain said arms in one limit of their movement relative to said castings, as and for the purpose set forth.

19. In a grain-binder, a framework having lugs, an oscillatory knotter-operating shaft mounted in said framework, hollowed or chambered castings mounted on to rock with said shaft, arms pivotally mounted in the free ends of said castings, rods mounted to slide freely through the chambers in said castings and pivotally connected to said arms at points forward of their pivotal connection to said castings, springs arranged in said chambers and operating to yieldingly project said rods endwise toward said arms, whereby said arms are yieldingly held in one limit of their swing relative to said castings, the free ends of said rods arranged to engage said lugs when said castings approach the limit of their oscillation in one direction, thereby positively forcing said arms to the limit of their movement, as and for the purpose set forth.

20. In a grain-binder, bundle forming and compressing and cord-knotting mechanisms a shaft, for actuating said cord-knotting mechanism, and means for rocking the same, castings mounted thereon to rock therewith, arms pivotally mounted in the free ends of said castings, rods connected to said arms, and a spring mounted on each rod and operating between a collar on said rod and a portion of said casting, as and for the purpose set forth.

21. In a grain-binder, a framework having lugs formed thereon, a shaft mounted in said framework, means for rocking said shaft, castings mounted thereon to rock with said shaft, arms pivotally mounted in the free ends of said castings, rods connected to said arms and having the free ends thereof arranged to be engaged by said lugs when said castings are rocked to the limit of their movement in one direction, as and for the purpose set forth.

22. In a grain-binder, an oscillatory knotter-operating shaft, castings mounted to rock therewith, discharge-arms pivotally mounted in the free ends of said castings, said arms provided with heel projections, rods pivotally connected to said arms at points forward of their pivotal connections to said castings, said rods arranged to be engaged by said heel projections to limit the swing of said arms in one direction relative to said castings, and springs arranged to yieldingly project said rods toward their point of connection with said arms, as and for the purpose set forth.

23. In a grain-binder, a knotter-operating wheel, means for rocking the same, in combination with a knotter-bill, an operating-pinion therefor, and a pivoted dog carried by said wheel for throwing said pinion into commission, as and for the purpose set forth.

24. In a grain-binder, a knotter-operating wheel having a rack-gear formed thereon, a pawl mounted upon said wheel, in combination with a knotter-bill, an operating-pinion therefor, said pinion arranged to be engaged by said pawl to rotate the same into mesh with said rack-gear, as and for the purpose set forth.

25. In a grain-binder, a knotter-operating gear, a pawl pivotally mounted thereon, a spring arranged to throw the end of said pawl outwardly, in combination with a knotter-bill, a pinion for operating the same, and a lug formed on said pinion arranged to be engaged by said pawl, as and for the purpose set forth.

26. In a grain-binder, a knotter-frame having a lug formed thereon, a knotter-wheel, means for rocking the same, a pawl pivotally mounted on said wheel, a knotter-operating pinion arranged to be engaged by said pawl on the forward movement thereof and to ride outside of said pawl on the backward movement of said wheel, whereby when said wheel is rocked to its extreme limit in one direction the tail of said pawl is engaged by the lug on said frame, thereby throwing outwardly the engaging end of said pawl, as and for the purpose set forth.

27. In a grain-binder, a knotter-operating wheel, a knotter-bill-operating pinion arranged to be engaged and actuated by said wheel, in combination with means for locking said pinion against movement during the rocking movement of said wheel in one direction, and for engaging and actuating said pinion when said wheel is moved in the opposite direction, as and for the purpose set forth.

28. In a grain-binder, a knotter-gear, means for rocking the same, a knotter-bill pinion having a delay-surface formed thereon and arranged to be engaged and actuated by said gear, the teeth of said pinion next adjacent to said delay-surface being of greater length than the other teeth of said pinion, and a pivotally-mounted pawl carried by said wheel whereby said pinion is locked against rotation during the rocking movement of said wheel in one direction, but is engaged by said pawl when said wheel is rocked in the opposite direction, as and for the purpose set forth.

29. In a grain-binder, a knotter-operating wheel having projections thereon forming delay-surfaces, an oscillatory shaft upon which said wheel is mounted, means for actuating said shaft, in combination with a cord-holder, a shaft upon which said holder is mounted, a gear having teeth, and delay-surfaces arranged to coöperate with the projections and delay-surfaces on said wheel, whereby when said wheel is rocked said holder is also rocked and then locked, and a clamp with which said holder coöperates, as and for the purpose set forth.

30. In a grain-binder, a knotter-operating wheel having projections formed on the face thereof and constituting delay-surfaces, the ends of said delay-surfaces presenting in opposite direction, and means for rocking said wheel, in combination with a cord-holder, a shaft upon which said cord-holder is mounted, a gear carried by said shaft and having oppositely-presented teeth and coöperating delay-surfaces, whereby when said knotter-wheel is rocked one or the other of said teeth is engaged by the end of one or the other of said projections, thereby rocking said shaft and locking the same, and a clamp arranged to coöperate with said holder, as and for the purpose set forth.

31. In a grain-binder, a knotter-operating wheel having projections thereon forming delay-surfaces, an oscillatory shaft upon which said wheel is mounted, means for actuating said shaft, a cord-holder, a shaft therefor, a gear having teeth arranged to be respectively engaged by the projections on said wheel, whereby when the wheel is rocked said shaft is also rocked and locked, a clamp arranged to coöperate with said holder, and a severing-knife connected to move with said holder, as and for the purpose set forth.

32. In a grain-binder, a knotter-operating wheel having projections thereon forming delay-surfaces, an oscillatory shaft on which said wheel is mounted means for actuating said shaft, a cord-holder shaft having a gear thereon, said gear provided with oppositely-arranged teeth adapted to be respectively engaged by said projections, whereby said shaft is rocked in one direction or the other when said wheel is rocked, and is locked in position, said cord-holder provided with an upturned flange, a stationary clamp arranged to coöperate with said flange, and a cutter, curved in the direction of its length, mounted on to move with said holder, as and for the purpose set forth.

33. In a grain-binder, a knotter-operating wheel, a cord-holder, a shaft therefor, means actuated by the movement of said wheel for rocking said shaft, and a clamp with which said holder coöperates, in combination with a cord-stripper, and means actuated by the movement of said cord-holder shaft for operating said stripper, as and for the purpose set forth.

34. In a grain-binder, a knotter-bill, a wheel for actuating the same, a cord-holder and coöperating clamp, a shaft for said holder, and means actuated by the movement of said wheel for rocking said shaft, a stripper, and means actuated by the movements of said cord-holder shaft for rocking said stripper, as and for the purpose set forth.

35. In a grain-binder, a knot-forming mechanism, a knotter-wheel for actuating the same, said wheel provided with projections and delay-surfaces on the face thereof, a cord-holder, a shaft therefor, a gear on said shaft arranged to be engaged, rocked and locked by said projections and delay-surfaces, a stripper-plate pivotally mounted and having a slotted heel extension, and a projection formed on said holder and arranged to operate in said slotted heel extension for rocking said stripper, as and for the purpose set forth.

36. In a grain-binder, a knot-forming mechanism, a knotter-wheel for actuating the same, said wheel provided with projections forming delay-surfaces, a cord-holder, a shaft therefor, a gear mounted on said shaft and having oppositely-arranged teeth, arranged to be engaged by said projections, whereby when said wheel is rocked said shaft is also rocked and locked in position, a stripper-plate pivotally mounted and provided on one side of its pivot with a crotch or opening and a guiding extension, and on the other side of said pivot with a slotted heel extension, said holder provided with a projection arranged to operate in the slot in said heel extension, whereby said stripper is actuated, as and for the purpose set forth.

37. In a grain-binder, a knotter-operating wheel, means for rocking the same, in combination with a knotter-bill, an operating-pinion therefor, and a yielding dog carried by said wheel for throwing said pinion into commission, as and for the purpose set forth.

PAUL HANSON.

Witnesses:
E. C. SEMPLE,
FRANK T. BROWN.